INVENTOR.
CHARLES S. PHELAN
BY
FOWLER, KNOBBE
& MARTENS
ATTORNEYS.

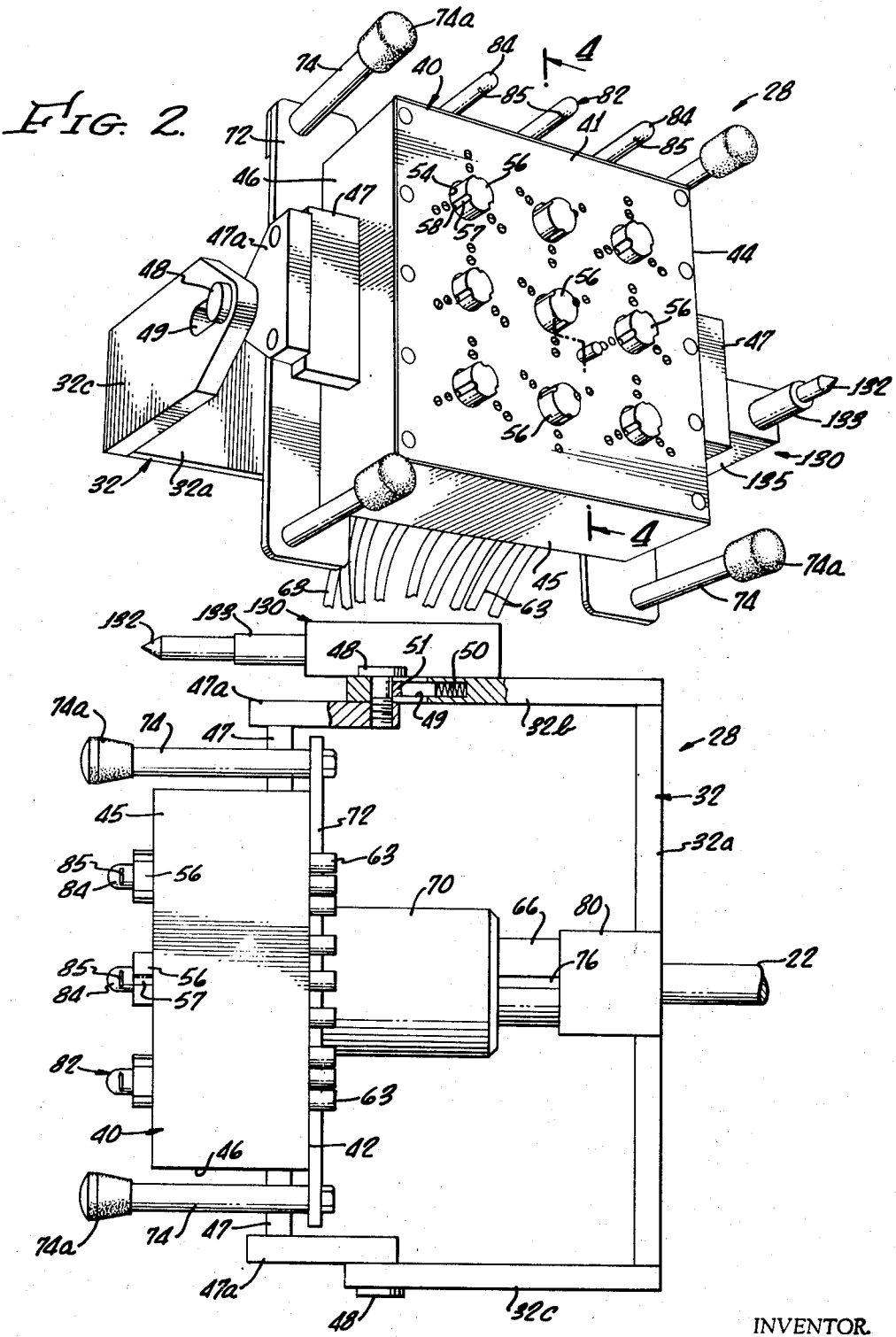

INVENTOR.
CHARLES S. PHELAN

BY
FOWLER, KNOBBE
& MARTENS
ATTORNEYS.

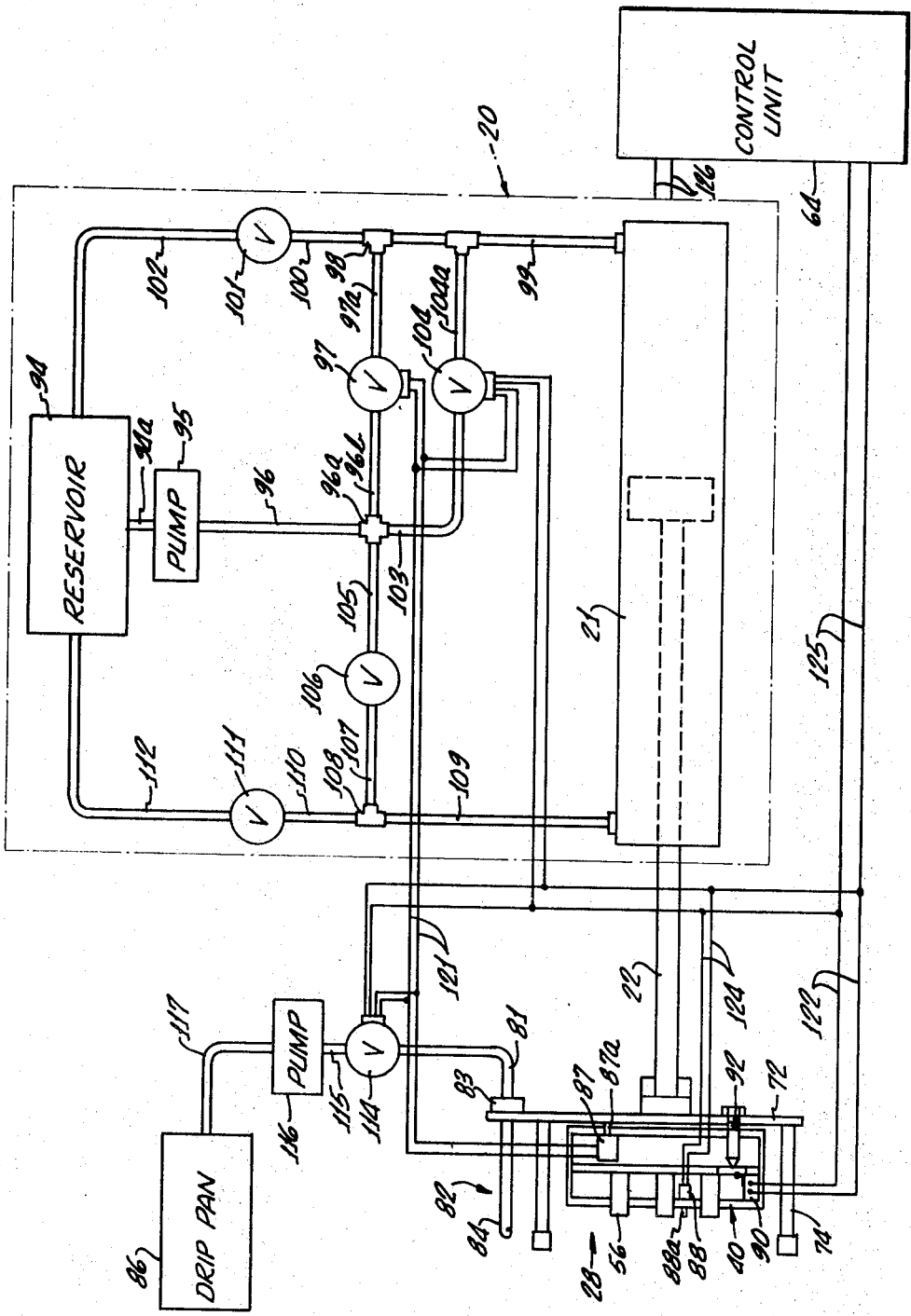

United States Patent Office

3,534,591
Patented Oct. 20, 1970

3,534,591
AUTOMATED ULTRASONIC BOND TESTER
Charles S. Phelan, Tustin, Calif., assignor to Shurtronics Corporation, a corporation of California
Filed Sept. 26, 1968, Ser. No. 762,816
Int. Cl. G01n 29/00
U.S. Cl. 73—67.8                                    21 Claims

ABSTRACT OF THE DISCLOSURE

A universally mounted assembly carrying crystal transducers is automatically moved into and out of engagement with a structure made of layers bonded together by an adhesive to test ultrasonically the quality of the bonds. Sensing posts movably mounted on the assembly engage the bonded structure before the transducers and cause a reduction in the speed of movement of the assembly towards the structure and initiation of a flow of couplant fluid onto the structure in the areas of the transducers. A "ready" switch mounted on the assembly stops movement of the assembly towards the structure, stops flow of the couplant fluid, and initiates energization of the transducers.

BACKGROUND OF THE INVENTION

This invention relates to an improved arrangement for automating the use of ultrasonic test apparatus for evaluating the integrity of a structure, and particularly the quality of the bonds between layers of a bonded structure, such as aircraft fuselage walls.

In known ultrasonic bond testing apparatus, a piezoelectric crystal is mounted in a probe which is coupled to the material under test by a film of couplant fluid. When the crystal is ultrasonically energized, the structural integrity of the bonded structure may be determined. An unsatisfactory bond is indicated as a movement of an electrical meter or as a change in an oscilloscope pattern due to changes in the mechanical impedance of the structure.

As jet aviation has advanced, the air frame structures used have grown in size such that bonded fuselage panels are too large to permit an inspector to maneuver conveniently a hand held probe. Consequently, it is desirable that such bond testing be automated in a manner such that a large percentage of the surface of the panels can be accurately and efficiently tested. The system must naturally be much faster than performing the operation by hand, but at the same time, the sensitive test equipment must not be damaged so that accurate readings are obained. Thus, it is important that the transducers be moved from one portion of the panel as quickly as possible between test operations but the transducers must, nevertheless, approach and contact the material to be tested at a relatively slow speed. Also, the various operations necessary during testing must be automatically and accurately initiated and terminated in the proper sequence. It is also necessary that the equipment be capable of accommodating test surfaces which have considerable curvature as may be found in the fuselage of an aircraft, recognizing that such curves are often irregular and compound.

SUMMARY OF THE INVENTION

Briefly stated, the bond tester apparatus includes a probe head assembly carrying one or more transducers to be placed in contact with the surface of the structure to be tested. Location sensing means mounted on the assembly extend beyond the transducers toward the test structure so as to engage the structure before the transducers. Being movable relative to the transducers, the location sensing means permits the transducers to be moved towards the test structure after contact has been made by the sensing means. A hydraulic ram or other power means is provided for moving the assembly to and from the test structure. When the location sensing means contacts the test structure, the power means is controlled automatically in a manner to reduce the speed of the transducers toward the test structure. This insures that the transducers will not strike the test structure with excessive force, but the assembly will be moved quickly during the rest of its cycle.

As another feature of the invention, fluid dispensing means is mounted on the probe head assembly, and the relative movement between the sensing means and the transducers is employed to initiate operation of the fluid dispensing means. A single switch is used to reduce the speed of the assembly towards the test structure and to initiate fluid flow onto the test area.

To enable the probe head assembly to accommodate curved surfaces, the assembly is mounted on a yoke which is pivotable about a horizontal axis between the yoke arms and also about a vertical axis.

BRIEF DESCRIPTION OF THE DRAWINGS

FIG. 2 is a perspective view of the probe head assembly showing the forward portion, which is to be placed in contact with the test structure;

FIG. 3 is a bottom plan view of the probe head assembly;

FIG. 6 is a diagrammatic illustration of the probe head assembly together with hydraulic means for moving the assembly and the fluid dispensing means for applying coupling fluid to the test structure.

DETAILED DESCRIPTION OF A PREFERRED EMBODIMENT

Figure 1:
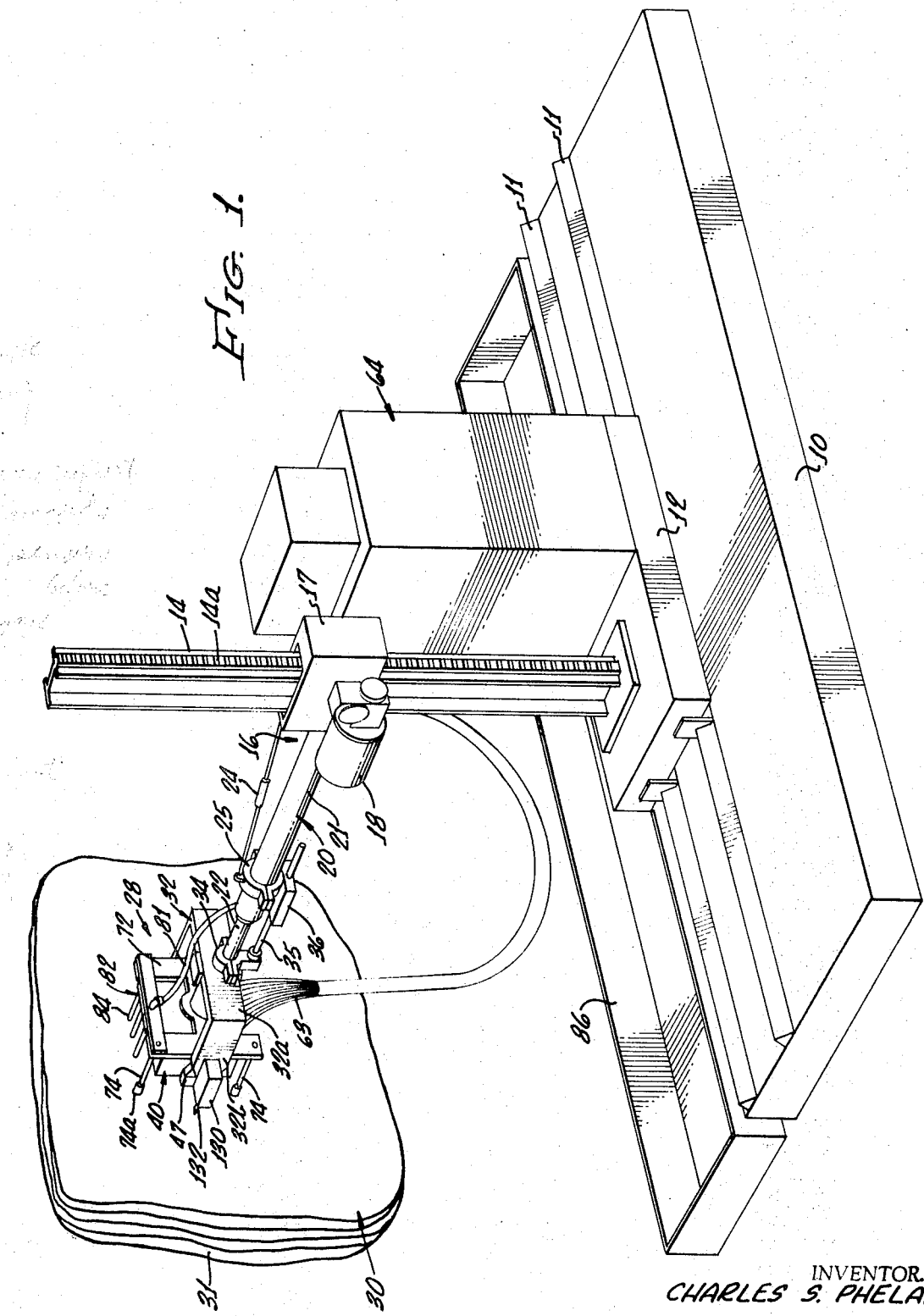
FIG. 1 is a perspective somewhat schematic view of the automated bond tester of the invention.

Referring first to FIG. 1, the automated bond tester of the invention includes a supporting base platform 10 and a horizontally extending track 11 with a traverse car 12 movably mounted thereon. Mounted on the traverse car 12 is a stanchion 14 having a vertical gear track 14a. An elevator assembly 16 is mounted on the stanchion 14 and includes a housing 17 surrounding the stanchion and an electric motor 18 supported on the housing and internal driving gears (not shown) to cooperate with the gear track 14a in moving the elevator assembly up and down the stanchion 14.

A hydraulic power unit 20 includes a cylinder 21 and a piston 22 with the cylinder 21 pivotally attached to the housing 17 of the elevator assembly 16. A turnbuckle 24 extending between a collar 25 on the outer end of the cylinder 21 and a portion of the housing 17 above the inner end of the cylinder supports the cylinder and enables it to be raised or lowered at its outer end.

Supported on the outer end of the piston 22 is a probe head assembly 28 which is to engage the structure 30 to be tested. For purposes of illustration the structure 30 may be thought of as a section of an aircraft fuselage made of layers 31 bonded together by an adhesive. The probe head assembly 28 includes a generally U-shaped yoke 32 having its bight portion 32a attached to the end of the piston 22. A collar 34 on the end of the piston 22 has a depending portion to which is attached guide rod 35 that extends rearwardly and slides within a guide 36 attached to the more rearward collar 25. The rod and guide prevent the yoke 32 and hence the assembly 28 from rotating on the end of the shaft 22.

Referring now to FIGS. 2–5, the probe head assembly 28 includes a box-like central enclosure or unit 40 formed by a front panel 41 and a rear panel 42 joined together by side walls 43, 44, 45 and 46. Attached respectively to the side walls 44 and 46 by suitable fasteners are a pair of spacers 47 and support brackets 47a. A pair of pins 48 extend outwardly from the brackets 47a into elongated recesses or slots 49 in the yoke arms 32b and 32c. The slots are generally horizontally oriented extending in the longitudinal direction of the yoke arms. Each slot contains a spring 50 urging a bearing element 51 into frictional engagement with the side of a pin 48 so that the central unit is urged forwardly into the forward ends of the slots 49.

The central unit 40 also includes a forward inner plate 52 and a rear inner plate 53, both of which are attached to the side walls 43–46 in suitable fashion. In the front panel 41, there is formed a pattern of nine holes 54 arranged in the form of a square. Within each hole 54 there is positioned a short, cylindrical piezoelectric crystal 56 which serves as a transducer for translating electrical energy into mechanical energy. The crystals can be made of a variety of materials, one suitable substance being barium titanate ceramic ($BaTiO_3$). Each transducer 56 is formed with three axially extending grooves 57 in its outer cylindrical hurface that extend from the outer axial face of the transducer and terminate spaced from the inner axial face. Three guides 58 attached to the front panel 41 and spaced around each of the transducers extend into the axial grooves 57 and loosely guide the transducer while limiting its outward movement.

The axial faces of the transducers are formed with an electrically conductive coating (not shown), and the coating also extends into the grooves 57 so that electrical continuity is maintained between the outer face of the transducers and the guides 58 which in turn are connected to the panel 41. The inner axial face of each transducer is engaged by the forward end of an electrically conductive pin 60 which extends through the forward inner plate 52. The rear end of each conductive pin extends through the rear inner plate 53. A coil spring 62 surrounding each of the pins has one end in engagement with the plate 53 and its other end engaging the shoulder on the conductive pin to urge the pins forwardly into engagement with the rear face of the transducers. The details regarding the mounting of the transducers within the fornt panel are set fort hin a copending application entitled "Improved Probe for Bond Tester," Ser. No. 762,689 filed Sept. 26, 1968 by the same inventor, assigned to the same assignee as this invention.

The rear of each conductive pin 60 is connected by a power cable 63, a group of which are shown in FIG. 1 leading to a power and control unit 64 mounted on the traverse car 12. The power cables 63 are shown in FIG. 2 but are not illustrated in FIGS. 4 and 5 so as to simplify the drawings.

Referring again to FIGS. 4 and 5, there is shown a tubular collar 66 extending through a hole in the rear panel 42 of the central unit 40 and extending rearwardly from the panel. A flange 66a on the collar 66 is attached by suitable fasteners 67 to the rear panel 42.

Slideably mounted on the exterior of the collar 66 is a sleeve 70 having a flange 70a attached by suitable fasteners 71 to a support plate 72 which extends parallel to the rear panel 42 of the central unit 40. The corners of the support plate 72 extend beyond the periphery of the central unit 40. Mounted on each corner of the support plate 72 is a sensing post 74 which extends forwardly along the sides of the central unit 40 and beyond the front panel 41 of the central unit and beyond the transducers 56 carried by the front panel. The sensing posts 74 are each provided with a cap 74a on their outer ends made of a material suitable to contact the material to be tested by the apparatus.

Figure 4:
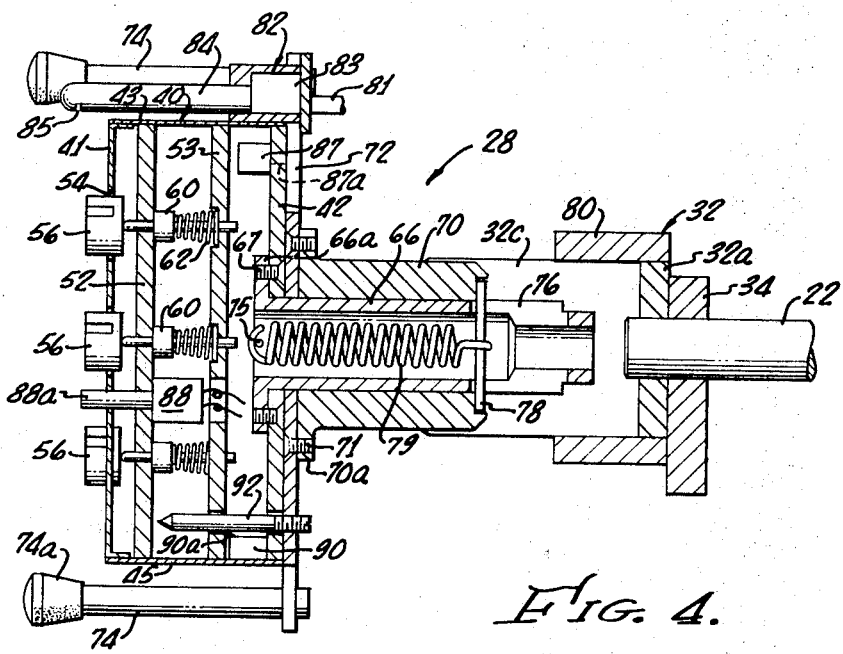
FIG. 4 is a cross sectional view of the head assembly on line 4—4 of FIG. 2 showing the assembly with the sensing means extending beyond the forward faces of the transducers.
Figure 5:
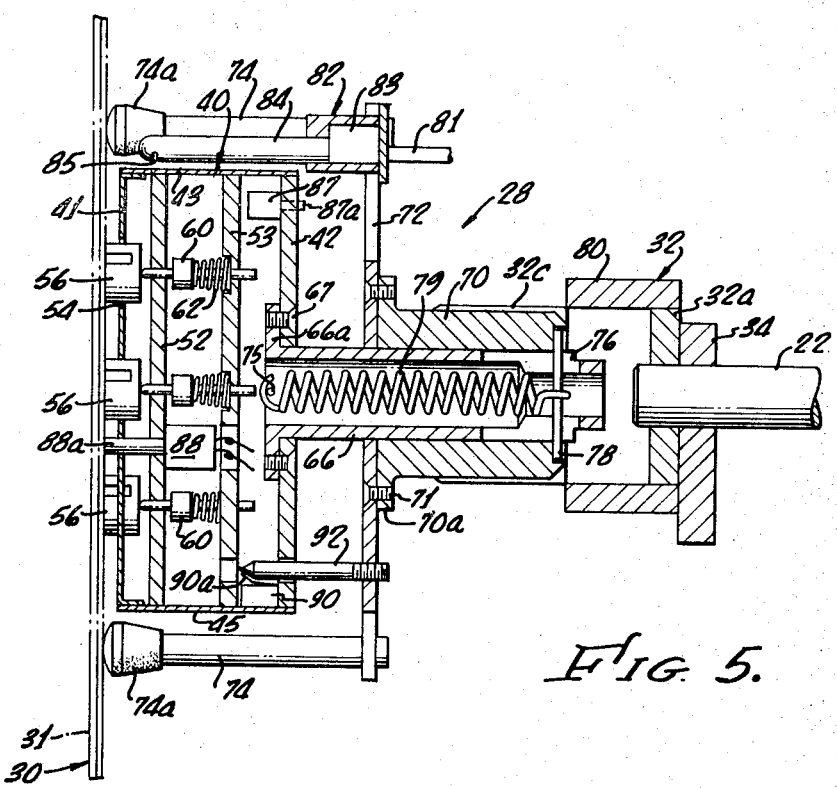
FIG. 5 is a cross sectional view like that of FIG. 4 except that the probe head assembly is shown in operation with its transducers in contact with a test structure.

Still referring to FIGS. 4 and 5, a forward pin 75 extends across the forward end of the collar 66 and a diametrical slot 76 is formed near the rear end of the collar 66. A rear pin 78 extends through the slot 76 in the collar and is supported on each end by a recess in the outer end of the sleeve 70. A coil spring 79 is positioned within the collar 66 with one end hooked on the forward pin 75 and the other end hooked on the rear pin 78. The spring is tensioned such that the support plate 72 carrying the sensing posts 74 is urged forwardly by the spring into the position shown in FIG. 4 wherein the plate 72 engages the rear panel 42 of the center unit 40. The diameter of the sleeve 70 is such that it fits within a pair of guide plates 80 attached to the bight 32a of the yoke 32.

As may be seen in all of the drawings, there is also attached to the support plate 72 a fluid dispenser 82 including a manifold 83, FIG. 4, and a plurality of tubes 84 terminating in spray nozzles 85. As shown in FIGS. 2–4, the spray nozzles 85 are directed downwardly so that fluid sprayed from the nozzles diverges onto the forward faces of the transducers and the area directly in front of the transducers. Referring to FIG. 1, a hose 81 connected to the manifold 83 provides fluid to the dispensing means 82. An elongated shallow drip pan 86 located beneath the probe head assembly 28 and beneath the test structure 30 collects fluid dripping therefrom.

There is shown in FIGS. 4 and 5, a switch 87 mounted on the rear panel 42 and having an actuator 87a, which extends rearwardly through the rear panel 42 (FIG. 5) and is depressed by the support plate 72 in the position of the plate shown in FIG. 4, wherein the plate 72 engages the panel 42. Still referring to FIG. 4, there is a "ready" switch 88 mounted on the forward inner plate 52 with its actuator button 88a extending forwardly through the panel 52 and through the front panel 41 with the outer end of the actuator button being approximately aligned with or extending slightly beyond the forward faces of the transducers 56. The button 88a may also be seen in FIG. 2 as being located between a group of transducers.

A safety switch 90 is mounted on the side wall 45 of the central unit 40 with its arm 90a depressed by a rod 92 threadably mounted in the support plate 72 and extending forwardly through openings in the rear inner plate 53 and the rear panel 42 of the central unit 40. The rear end of the rod 92 is slotted so that it can be rotated inwardly or outwardly to adjust its position with respect to the switch 90.

Refer now to FIG. 6 for a schematic illustration of the hydraulic unit 20 and the electrical connections as well as the remainder of the fluid dispenser. The cylinder 21 of the hydraulic unit 20 is shown with its piston 22 attached to the yoke 32 supporting the probe head assembly 28. A supply of hydraulic fluid is stored in a reservoir 94 which is connected by a conduit 94a to a pump 95. The output of the pump 95 is connected by a conduit 96 to a 4-way connector 96a and a conduit 96b to a solenoid operated full flow valve 97 which is connected by a conduit 97a to a T-connector 98. A conduit 99 leads from the connector 98 to the right end of the cylinder 21 while the other end of the connector 98 is attached to a conduit 100 leading into a solenoid operated bleed valve 101, which in turn is connected by a conduit 102 to the reservoir 94. A conduit 103 is also connected to the output of the pump 95 through the connector 96a and leads into a solenoid operated reduced flow valve 104, which in turn is connected by the conduit 104a to the conduit 99 leading to the right end of the cylinder 21.

A third conduit 105 connects the pump output through the connector 96a to a solenoid operated reverse valve 106 connected by a conduit 107, a T-connector 108 and a conduit 109 to the left end of the cylinder 21. The other end of the connector 108 is joined by a conduit 110 to a bleed valve 111, which in turn is connected by a conduit 112 to the reservoir 94. The hydraulic pump 95 and its reservoir 94 together with the various valves and conduits may be conveniently housed within the control unit 64. The conduits 99 and 109 leading to the hydraulic cylinder are not illustrated in FIG. 1, for purposes of simplicity of the drawing.

Also shown in FIG. 6 is the remainder of the fluid dispenser 82. The hose 81 connected to the manifold 83 of the dispenser 82 is connected to a solenoid operated control valve 114 which in turn is connected by a conduit 115 to a pump 116. An input conduit 117 connects the pump to the drip pan 86.

Still referring to FIG. 6, there are shown electrical conductors 121 joining the switch 87 to the full flow valve 97, and the reduced flow valve 104 and the couplant fluid valve 114. Conductors 122 connect the safety switch 90 to the reduced flow valve 104 and the couplant fluid valve 114. The "ready" switch 88 is connected in parallel with the safety switch 90 by conductors 124 so that it controls the same operations as the switch 90. The purpose for this redundant arrangement will be subsequently explained. The switches 88 and 90 are also connected by the conductors 125 to the control unit 64. The various valves of the hydraulic unit 20 shown in FIG. 6 are electrically connected to the control unit 64, as illustrated schematically by the conductors 126 leading to the outline of the hydraulic unit 20.

Referring now to FIGS. 1, 2 and 3, there is shown mounted on the arm 32b of the yoke 32 a marking assembly 130. This assembly includes a marking pencil 132 or other marker mounted in a suitable holder 133 to be reciprocated forwardly toward the test structure when actuated by a solenoid (not shown) within the box 135. The solenoid is operated by the control unit 64, although, for purposes of simplicity, the electrical connections are not shown in the drawings.

OPERATION

To commence operation of the bond testing apparatus, the main horizontal platform 10, FIG. 1, is moved into position adjacent to the test structure 30 to be tested, or alternatively the apparatus can be permanently mounted and the test structure moved into position adjacent to the bond tester. The number and location of the test readings to be made on the test structure 30 are predetermined and programmed into suitable controls (not shown) within the control unit 64. These controls are not explained in that various arrangements using limit switches and other control elements can be employed, but these are not included in the present invention. The traverse car 12 is moved to the desired horizontal position along the track, and the elevator assembly 16 is moved on the stanchion 14 and its gear track 14a by means of the motor 18 to the desired vertical location.

To start operation of the hydraulic system and to move the head assembly into engagement with the test structure, a control button (not shown) on the control unit 64 is actuated to start the pump 95. Simultaneously, through the control unit, the full flow valve 97 shown in FIG. 6 is opened so that hydraulic fluid flows to the right end of the cylinder 21. The bleed valve 111 is also opened to permit fluid to flow from the left end of the cylinder 21 to the reservoir 94 while the hydraulic valves 101, 104 and 106 are closed. At this time, the fluid couplant valve 114 of the dispenser 82 is also closed. Fluid pressure applied to the right end of the cylinder 21 causes the piston 22 carrying the probe head assembly 28 to move forwardly towards the test structure 30. The speed of this movement is determined by the characteristics of the pump and the full flow valve 97. It is desirable that the piston 22 move quite rapidly so that the operation may be completed as quickly as possible. The desired speed is faster than the speed at which the transducers should engage the test structure.

As the head assembly nears the test structure, the sensing posts 74 carrying the caps 74a engage the surface of the test structure 30 and hence can move forwardly no further. However, since the central unit 40 is connected for relative movement with respect to the sensing posts by means of the collar 66, the sleeve 70, and the coil spring 79, the central unit 40 continues to move forwardly toward the test structure. As the rear panel 42 of the central unit moves away from the support plate 72 of the sensing means, the actuator 87a of the switch 87 is released as shown in FIG. 5.

Actuation of the switch 87 causes the full flow valve 97 to be closed while the reduced flow valve 104 is opened. Thus, the piston 22 carrying the head assembly 28 continues toward the test structure, but at a reduced speed. The speed selected is such that neither the test structure nor the transducers will be damaged when the transducers engage the test structure.

Referring to FIGS. 5 and 6, when the central unit 40 of the probe head assembly nears the test structure, the outer face of the button 88a of the "ready" switch engages the test structure and the switch 88 is actuated. The outer faces of the transducer engage the structure at about the same time that the "ready" switch 88 is actuated. Simultaneously, the rod 92 carried by the support plate 72 has released the arm 90a of the safety switch 90 so that it is also actuated. As previously mentioned, actuation of either of the switches 88 and 90 performs the same function. The reason for having both is that if the probe head assembly 28 should engage the edge of a test structure so that the "ready" switch button 88a overhangs the edge and is hence not depressed, the redundant safety switch 90 would still function. Actuation of either of the switches 88 and 90 closes the reduced flow valve 104 so that the piston 22 will stop moving toward the test structure and will remain stationary, with the transducers in contact with the tes structure.

Approximately .5 pound of hydraulic pressure urging the transducers against the test structure is desirable. The hydraulic unit 20 may also be provided with safety valve (not shown) for limiting the pressure which can be produced in the event the switches 88 and 90 should fail. A maximum of approximately 10 pounds would be appropriate.

Actuation of the switch 87 also operates the fluid couplant valve 114 in the fluid dispensing means and allows fluid to flow from the previously energized pump 116 into the manifold 83 and the tubes 84 so that coupling fluid is sprayed downwardly through the nozzles 85 onto the test structure 30. This spraying continues until actuation of the switches 88 and 90 closes the fluid couplant control valve 114. It is necessary that the fluid be between the outer faces of the transducers and the test structure to obtain good contact. Once the transducers have engaged the test structure, it is no longer necessary that the couplant fluid be sprayed into that area.

The third function performed by the switches 88 and 90 is that they initiate energization of the transducers through the conductors 125 leading to the control unit 64. The control unit 64 includes equipment for sequentially energizing the nine transducers 56 to take separate readings of the quality of the bond between the layers 31 of the structure. The electrical impedance of a transducer is affected by the mechanical impedance of the test structure which changes with the character of the bond between the layers of the test structure. Thus, a defective bond can be detected by a reading on a meter or an oscilloscope in the control unit. The apparatus for this sequential energization and reading of the results is all controlled through the control unit 64 and does not form a part of the present invention and hence is not described in detail herein.

The principles of operation for ultrasonic testing in general, is a known phenomenon and hence is not described in any detail in this publication. Ultrasonic bond testing equipment employing transducers of the type described herein and control equipment for energizing transducers and reading the output to determine the quality of a bond is presently sold by the assignee of the present invention. Thus, reference may be had to this organization for details of structure or operation regarding such konwn equipment.

If a defective bond is detected, the cotnrol unit actuates the marking assembly 130 mounted on the yoke 32 causing the marker 132 to mark the structure 30. Thus, the location can easily be later determined for further inspection or repair. If desired, a permanent record of all readings may be provided by a suitable "print out" device (not shown) in the control unit 64.

Only a very short time interval is required to take a reading on a given transducer, and hence the entire nine readings for the head assembly can be taken relatively quickly. At the completion of the test readings, the control unit 64 automatically causes the hydraulic reverse valve 106 to open and the bleed valve 111 to close while the bleed valve 101 is opened. Thus, the output from the pump 95 is directed to the left end of the cylinder 21 causing the probe head assembly 28 to be retracted. This action causes the sensing posts 74 and the central unit 40 to return to the condition shown in FIG. 4 in view of the tension forces caused by the spring 79. Simultaneously, the switches 87, 88 and 90 return to their former positions. While the probe head assembly 28 is being withdrawn, it can be raised or lowered by the elevator assembly 16 on the vertical stanchion 14 shown in FIG. 1 and the traverse car 12 can be horizontally moved as desired on the track 11, all as programmed by the control unit 64. When the next test location is reached, the control unit once more reverses the valves 97, 101 and 111 so that hydraulic pressure is once more applied to the right end of the cylinder 21 to cause the probe head assembly 28 to move forwardly toward the test structure to repeat the cycle.

One of the advantages of the probe head assembly 28 is that it can accommodate curved test structures as well as flat ones. When one or more of the sensing posts 74 first engage the test structure, the assembly 28 can pivot so that all posts engage the structure so that the transducers engage the test structure with their forward faces as parallel as possible to the test structure surface. The loose positioning of the transducers in the guides 58 also helps proper alignment. The pivotal movement of the posts 74 and the central unit 40 is permitted about the generally horizontal axis formed by the pins 48 in the yoke arms 32b and c. Pivotal or cocking movement about a generally vertical axis is permitted as a result of the pins 48 being spring biased within the slots 49 in the yoke arms, as seen in FIG. 3.

The guide plates 80 attached to the bight 32a of the yoke 32 straddle the rear of the sleeve 70 and hence limit pivotal movement of the central unit 40 about the axis formed by the pivot pins 48.

What is claimed is:

1. Automated apparatus for nondestructively testing the integrity of a structure comprising:
   a probe head assembly including a transducer to be placed in contact with the surface of the structure and location sensing means extending beyond said transducer toward the test structure so as to engage the test structure before the transducer, said location sensing means being movable relative to said transducer to permit the transducer to be moved towards the test structure after contact has been made by the sensing means;
   power means for moving said assembly to and from said test structure; and
   means connecting the location sensing means to said power means in a manner to reduce the speed of the transducer towards the test structure when the location sensing means engages the test structure.

2. The apparatus of claim 1 wherein said probe head assembly includes;
   means for spraying coupling fluid onto the area of the test structure which will be engaged by the transducer; and
   a switch operated by relative movement between the location sensing means and the transducer to initiate the flow of coupling fluid through said fluid spray means.

3. The apparatus of claim 2 wherein said fluid initiating switch is operated by location sensing means and said switch initiates the speed reduction of the transducer towards the test structure when the location sensing means engages the test structure.

4. The apparatus of claim 2 including a "ready" switch mounted on said head assembly to engage the test structure with the transducer, the ready switch being operated by the test structure to terminate the flow of coupling fluid onto said test structure, to stop movement of the head assembly and to energize the transducer.

5. The apparatus of claim 1 wherein said head assembly includes:
   a central unit supporting a plurality of transducers;
   said location sensing means includes a plate mounted on said central unit and supporting a plurality of posts extending toward said test structure beyond said transducers; and
   spring means connecting the plate to the central unit urging the posts forward beyond the transducers.

6. The apparatus of claim 5 wherein:
   said central unit includes a box-like enclosure having a front panel and a rear panel with the trandsucers extending outwardly from the front panel, a tubular collar attached to and extending rearwardly from the rear panel, and extending through said support plate;
   a tubular sleeve is attached to the support plate and surrounds said tubular collar so that the sleeve and the support plate carrying the posts are slideably mounted on the tubular collar; and
   a tension spring is positioned within the tubular collar connected so that the support plate carrying the posts is urged forwardly relative to the central unit.

7. The apparatus of claim 5 wherein:
   said plate is located behind said central unit and said spring means urges the plate forwardly against the rear of the central unit; and
   the means connecting the location sensing means to said power means includes a switch mounted on said central unit with a switch actuator normally extending rearwardly so that when the plate is urged into engagement with the central unit by said spring means, the actuator is depressed and when the plate is forced away from the central unit, the actuator is released.

8. The aparatus of claim 1 wherein said power means comprises a hydraulic piston and cylinder assembly with said head asssembly being mounted on the end of said piston.

9. The apparatus of claim 1 including means attaching said head assembly to said power means in a manner to permit the head to pivot to accommodate the curvature of the test structure so that the transducer is properly oriented with respect to said curvature.

10. The apparatus of claim 1 including means for moving said power means and said head assembly in a plane transverse to the movement of the head assembly toward the test structure.

11. Automated apparatus for nondestructively testing the integrity of a test structure comprising:
   a probe head assembly including a plurality of transducers to be placed in contact with the surface of the test structure, means for spraying a coupling fluid against the surface of the test structure to be engaged by the trandsucers, location sensing means extending beyond said transducers toward the test structure so as to engage the test structure before the transducers, said location sensing means being movable relative to said transducers to permit the trandsucers to be moved toward the test structure after contact is made by the sensing means;

power means for moving said head assembly to and from the test structure; and means connecting the location sensing means to said fluid spraying means to initiate the spray of fluid towards the test structure when the location sensing means engages the test structure.

12. The apparatus of claim 11 wherein said probe head assembly includes a box-like central unit supporting the trandsucers with the transducers extending forwardly from the unit, the coupling fluid spraying means includes at least one spray nozzle supported above the unit with the nozzle being oriented to direct the spray downwardly in the proximity of the outer faces of the transducers.

13. A multiple probe head assembly for use in nondestructively testing the integrity of adhesive bonds between layers of material forming a large composite wall comprising:

a central unit having a front panel with a pattern of holes formed therein and a plurality of transducers loosely positioned within the holes so that their outer faces may engage the composite wall;

a large yoke having its arms straddling the central unit with its arms connected by pivot pins to the side walls of the unit so that the unit may pivot about the pivot pins to facilitate conformance to the curvature of the wall; and power means attached to the rear of said yoke for moving the yoke to and from the wall.

14. The probe head assembly of claim 13 including:

slot means formed in the forward ends of the arms of the yoke with the slot means being oriented in the general direction oft he movement of the yoke, said pivot pins being received within the slot means;

spring means located within said slot means and urging the pivot pins toward the forward ends of the slot means which is in the direction towards the composite wall whereby the pivot pins can be separately moved rearwardly against the urging of its spring means to thus enable the box-like central unit to pivot or cock in directions perpendicular to the pivotal axis of the pivot pins.

15. The probe head assembly of claim 14 further comprising means for mounting each of said transducers enabling the transducers to move axially a limited amount and to cock within their holes a limited amount to facilitate conformance to the surface of the composite wall.

16. An automated apparatus for testing the quality of adhesive bonds between layers of a structure comprising:

a horizontal track extending adjacent the structure to be tested;

a traverse car assembly supported by and movable along said track;

an adhesive bond testing device including a control unit mounted on said car assembly;

a vertically extending stanchion mounted on said car assembly;

a piston and cylinder assembly mounted for vertical movement on said stanchion with said piston being movable horizontally towards and away from the test structure;

said bond testing device including a head assembly carried on the outer end of said piston and connected by electrical conductors to said control unit, the head assembly including a group of transducers having outer faces for engaging the surface of the test structure;

means for mounting said head assembly on the end of said piston to permit the head to move to accommodate curvature of the test structure;

the head assembly including sensing means mounted on said head and extending beyond said transducer faces toward the test structure to engage the test structure before the transducers, said sensing means being movable relative to said transducer to permit the transducer to be moved towards the test structure after contact has been made by the sensing means, the sensing means being connected to said piston and cylinder assembly to reduce the speed of the transducer toward the test structure when the sensing means engages the test structure; and a ready switch carried by said head assembly including an actuating element to engage said test structure with the switch being connected to energize the transducers when pressed against the test structure.

17. Apparatus for testing the quality of adhesive bonds between layers of a structure comprising:

a multiple probe head assembly including a box-like central unit having a front panel, a rear panel, a forward inner plate, and a rear inner plate, all arranged in spaced parallel relation by side walls connecting the panels and plates, said front panel having a plurality of holes formed therein with a plurality of transducers loosely positioned within said holes, each of the transducers having an electrically conductive coating on its forward face and its rear face, a plurality of conductive pins located between said inner plates with the forward portion of each pin extending through the forward inner plate to engage the rear conductive surface of a respective one of said transducers and with the rear portion of each conductive pin being guided within said rear inner plate, spring means located between said middle plates biasing the conductive pins forwardly toward the transducers, a tubular collar attached to said rear panel and extending rearwardly from the rear panel, location sensing means including a plurality of posts surrounding the box-like central unit and extending forwardly beyond the transducers, the posts being attached to a support plate extending in parallel relation to said rear panel of the central unit and located rearwardly of the rear panel, a tubular sleeve attached to said support plate surrounding said tubular collar, a tension spring positioned within said tubular collar and having its other end attached to a pin extending across the rear end of the tubular sleeve whereby the support plate carrying the sensing posts is biased forwardly by the spring to engage said rear panel;

power means attached to said central unit for moving the probe head assembly into and out of engagement with the structure to be tested;

said probe head assembly further including a switch mounted on said rear panel with its actuator extending rearwardly from the panel to be normally depressed by said support plate when it is engaging the rear panel, said switch being actuated as the sensing posts engage the bonded structure to be tested and the central unit continues to move forwardly relative to the support plate and sensing posts, said switch being connected to said power means to reduce the forward movement of the central unit after it is actuated by said sensing means.

18. The apparatus of claim 17 including a "ready" switch supported between said inner plates and having an actuator extending through the forward inner plate and the front panel to approximately the plane of the forward faces of said transducers, said ready switch being actuated as it engages the bonded structure and being connected to said power means to stop movement of the central unit towards the test structure and further being connected to initiate energization of the transducers to test the integrity of the bonded structure.

19. The apparatus of claim 18 including a safety switch mounted on said central unit and operated by a rod attached to said sensing means support plate, the rod and said safety switch being arranged such that the switch is not actuated until said sensing means has moved relative to said central unit an amount such that at least one of the transducers is engaging the bonded structure and said "ready" switch would normally be actuated, said safety switch being connected in a manner similar to that of said "ready" switch so that in the event said "ready" switch fails, said safety switch will perform the same function.

20. The apparatus of claim 17 wherein said power means is connected to said central unit by an enlarged yoke having its rear portion connected to the power means and its forward arms connected by pivot pins to the side walls of the central unit so that the central unit can pivot about the pivot pins, said pivot pins being mounted within said yoke arm in a manner such that they are individually movable rearwardly to permit the central unit to be cocked so as to conform to the curvature of the test structure.

21. The apparatus of claim 20 including means attached to the bight of said yoke straddling the rear portion of the sleeve of said sensing means to limit the pivotal movement of the central unit about said pivot pins.

References Cited

UNITED STATES PATENTS

| | | | |
|---|---|---|---|
| 2,881,408 | 4/1959 | Dudley | 340—3 |
| 3,323,354 | 6/1967 | Daubresse et al. | 73—67.8 |

RICHARD C. QUEISSER, Primary Examiner

A. E. KORKOSZ, Assistant Examiner

U.S. Cl. X.R.

73—71.5